Jan. 13, 1948. G. E. KLASSETT 2,434,498
BRAKE DRUM TRUEING MACHINE
Filed May 3, 1944 8 Sheets-Sheet 1
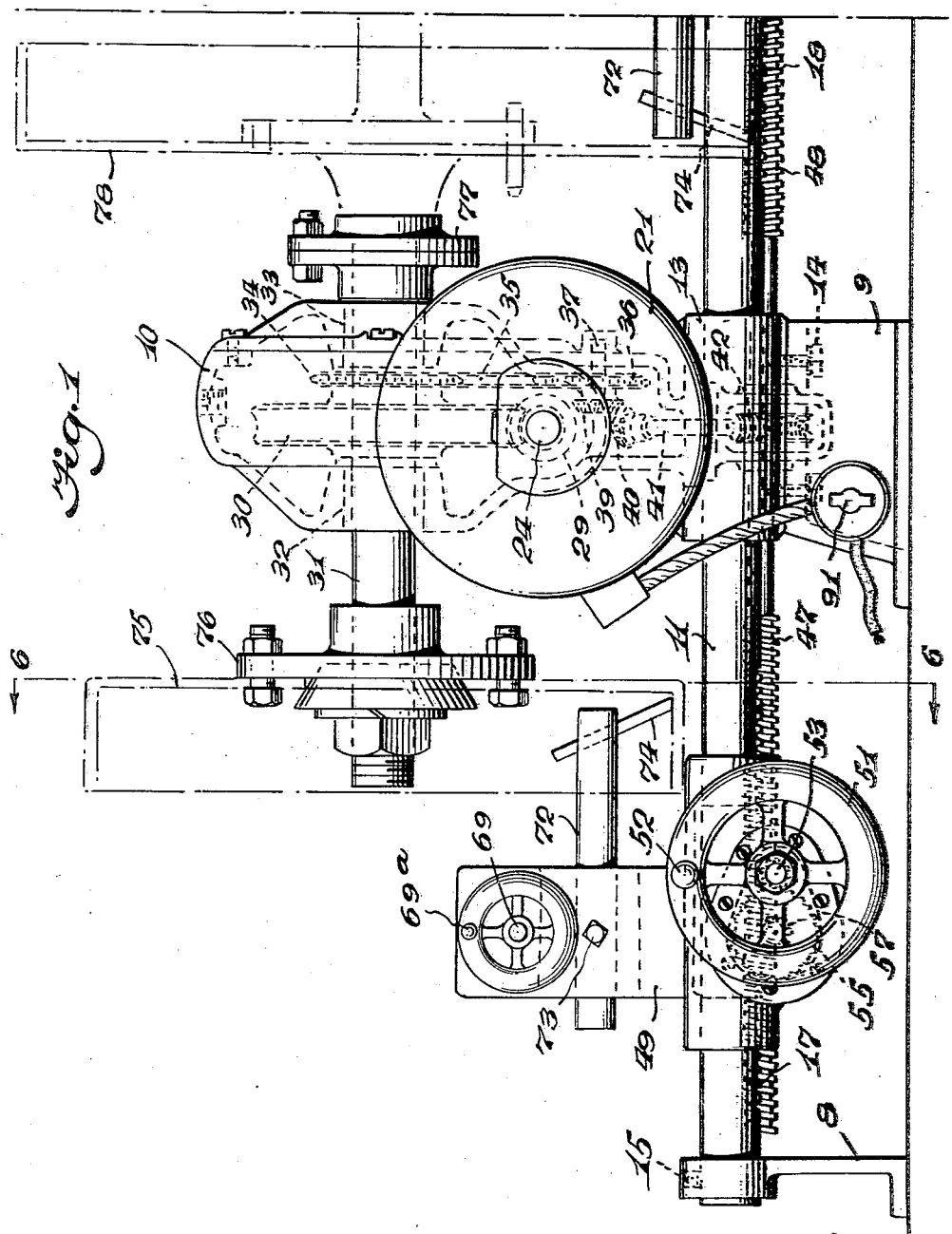
Inventor
George E. Klassett
By James Askins
Attorney

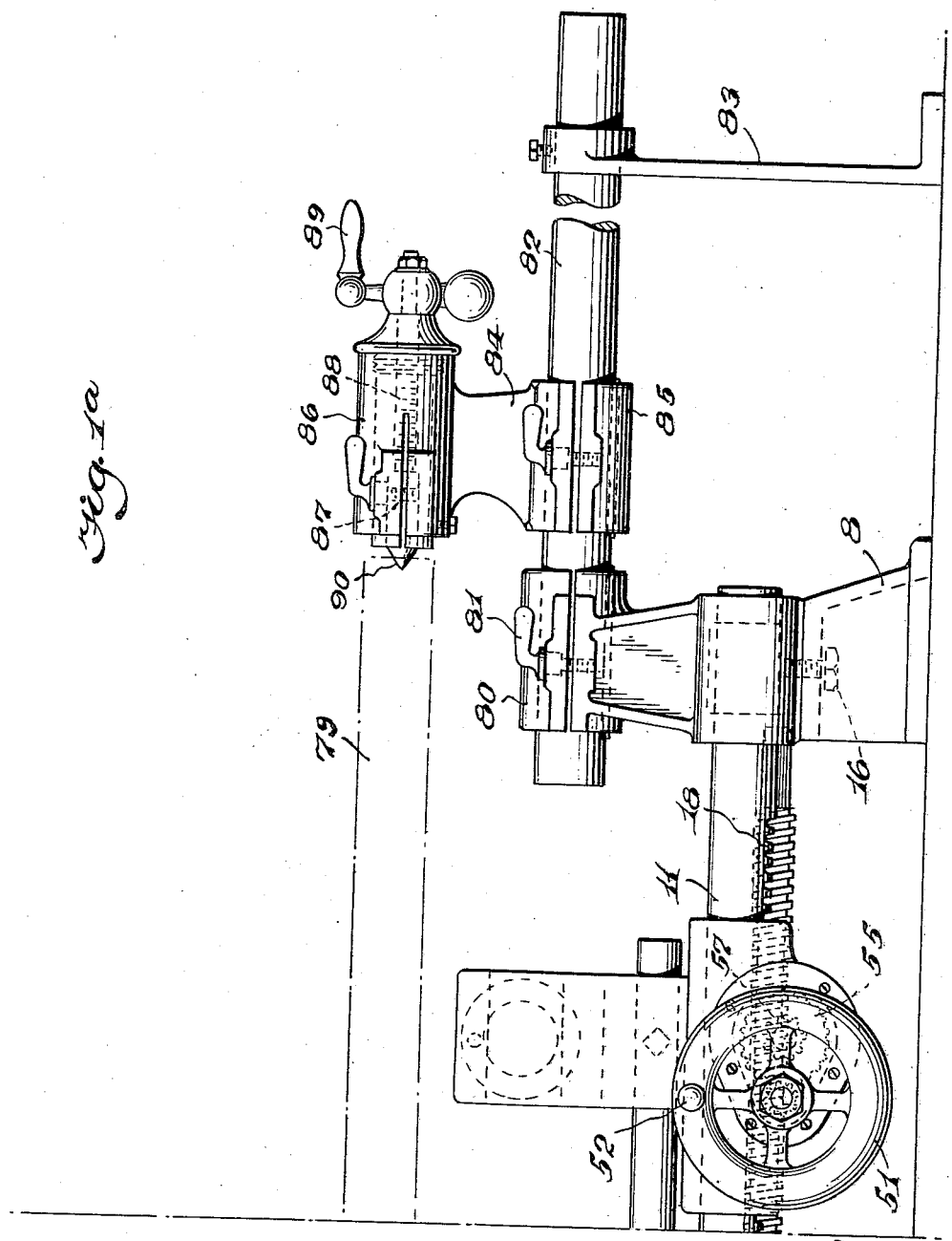

Jan. 13, 1948.　　　G. E. KLASSETT　　　2,434,498
BRAKE DRUM TRUEING MACHINE
Filed May 3, 1944　　　8 Sheets-Sheet 3
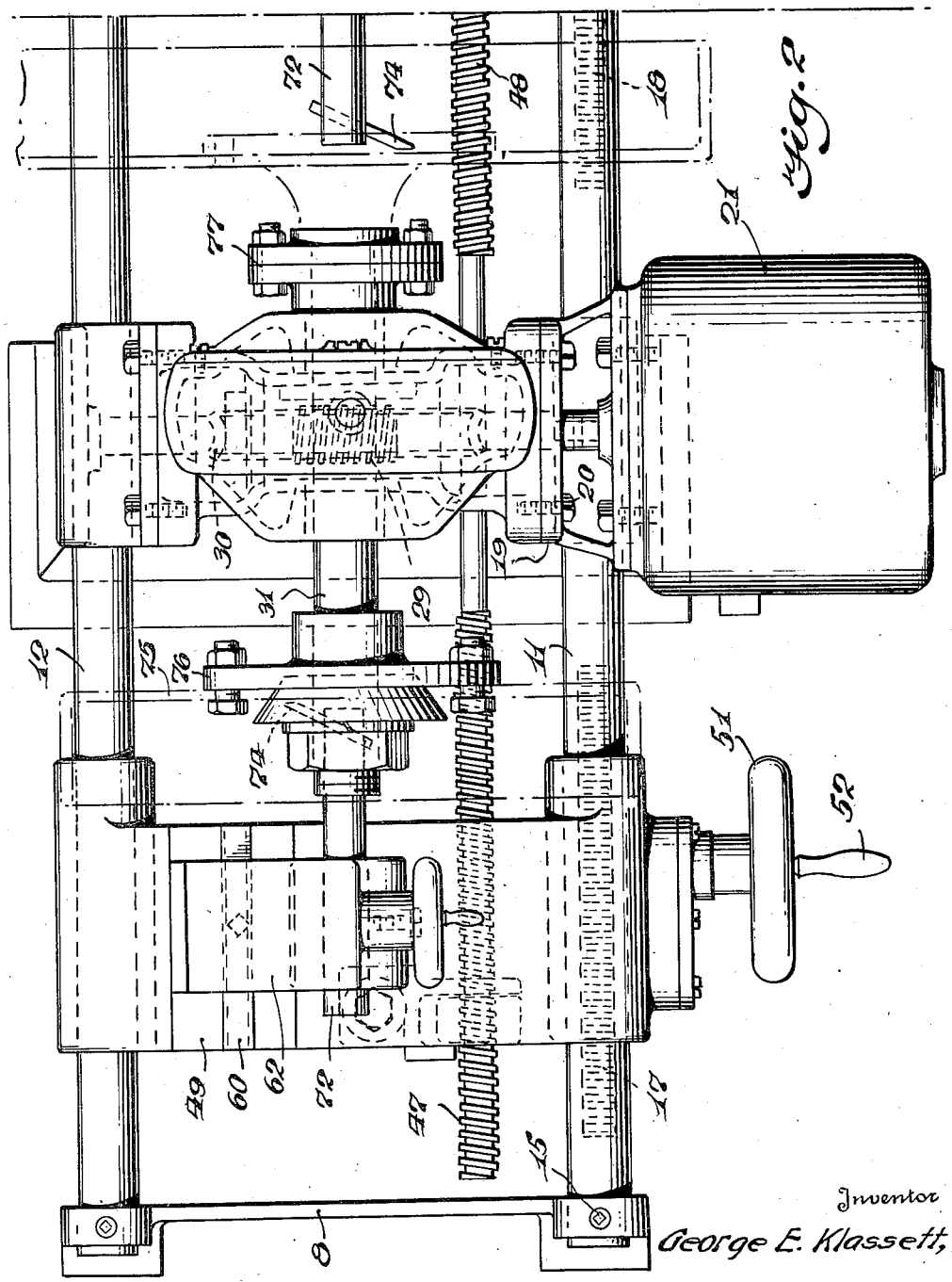
Inventor
George E. Klassett,
By [signature]
Attorney Jan. 13, 1948.                    G. E. KLASSETT                    2,434,498
                              BRAKE DRUM TRUEING MACHINE
                                  Filed May 3, 1944                 8 Sheets-Sheet 4
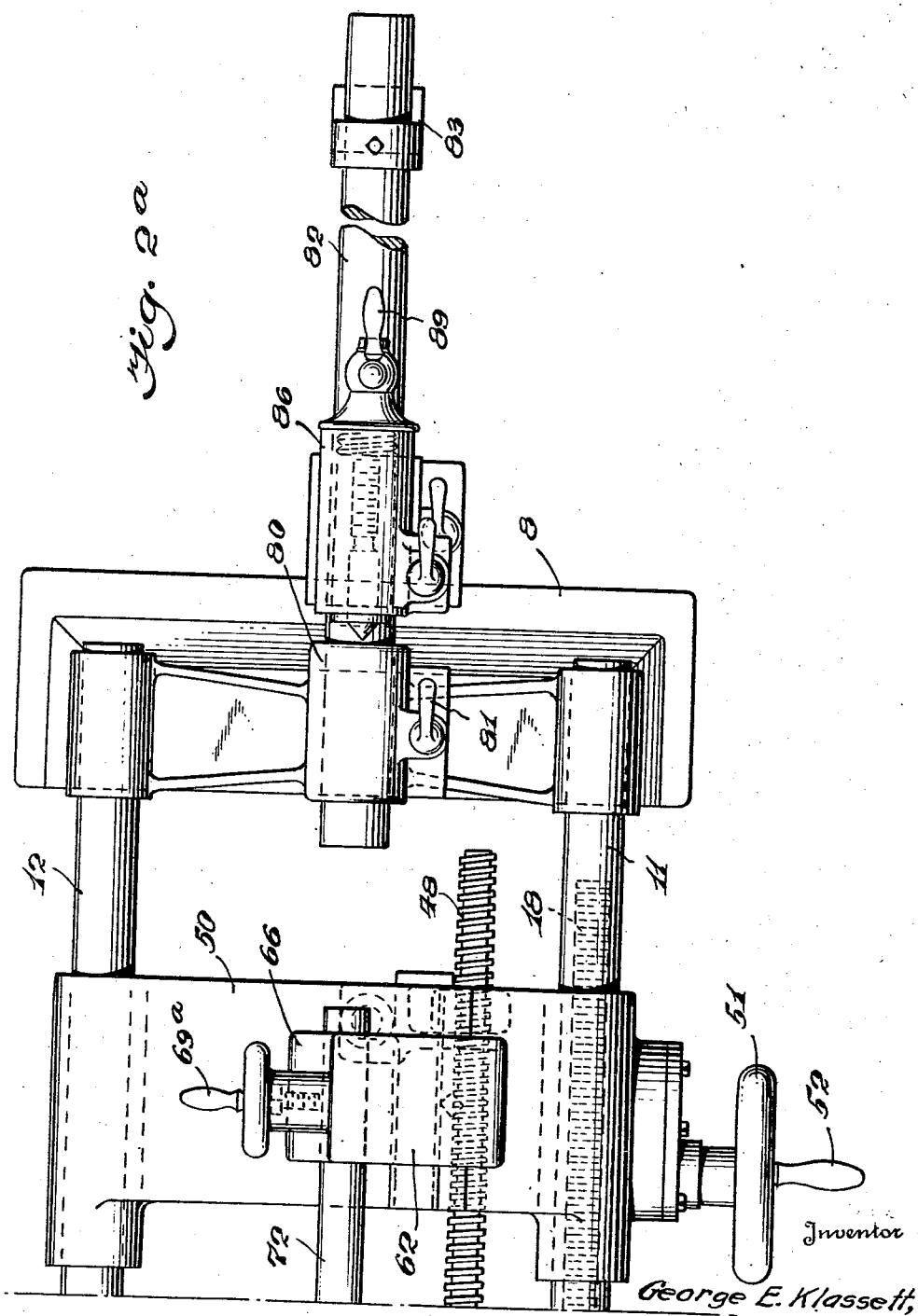

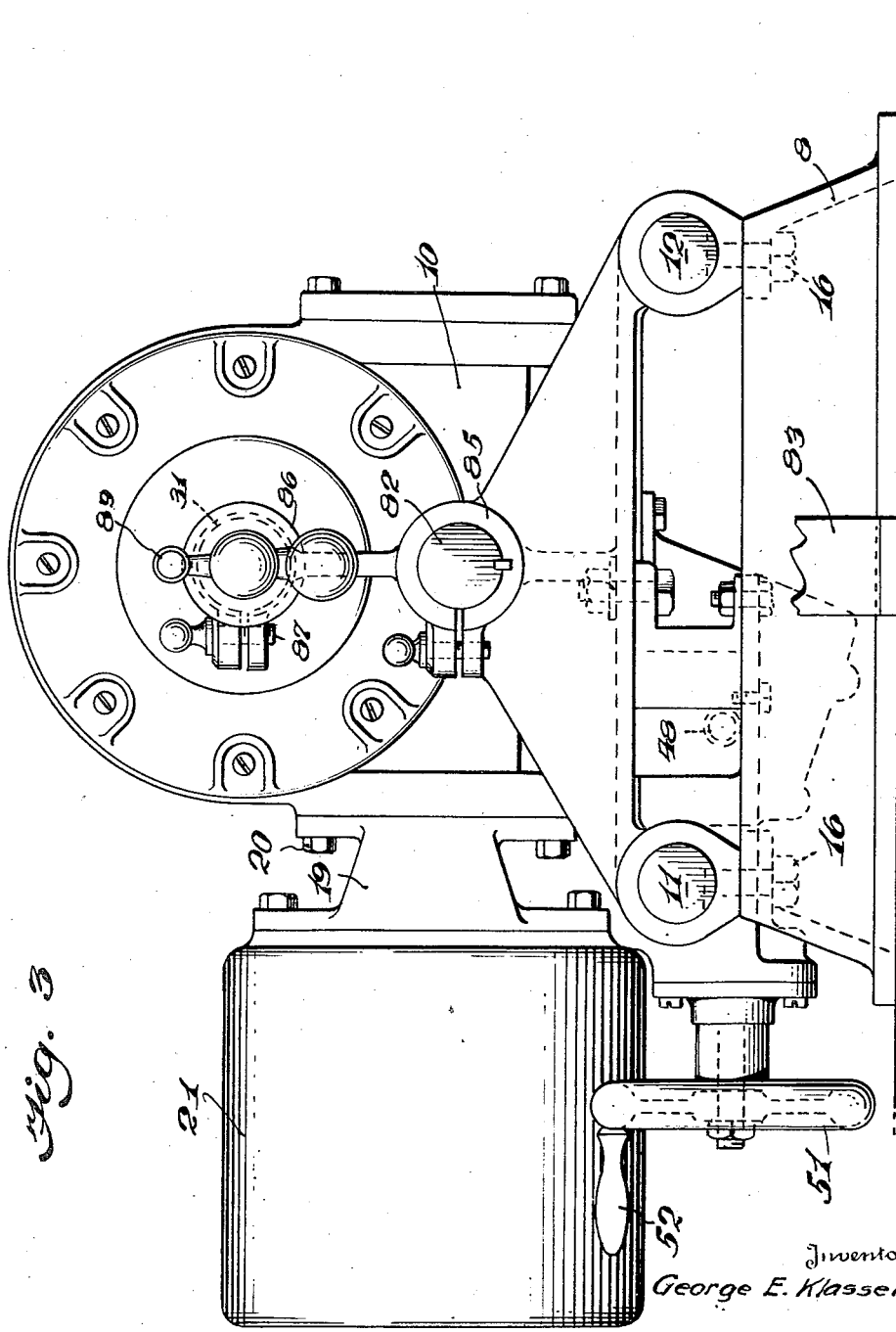

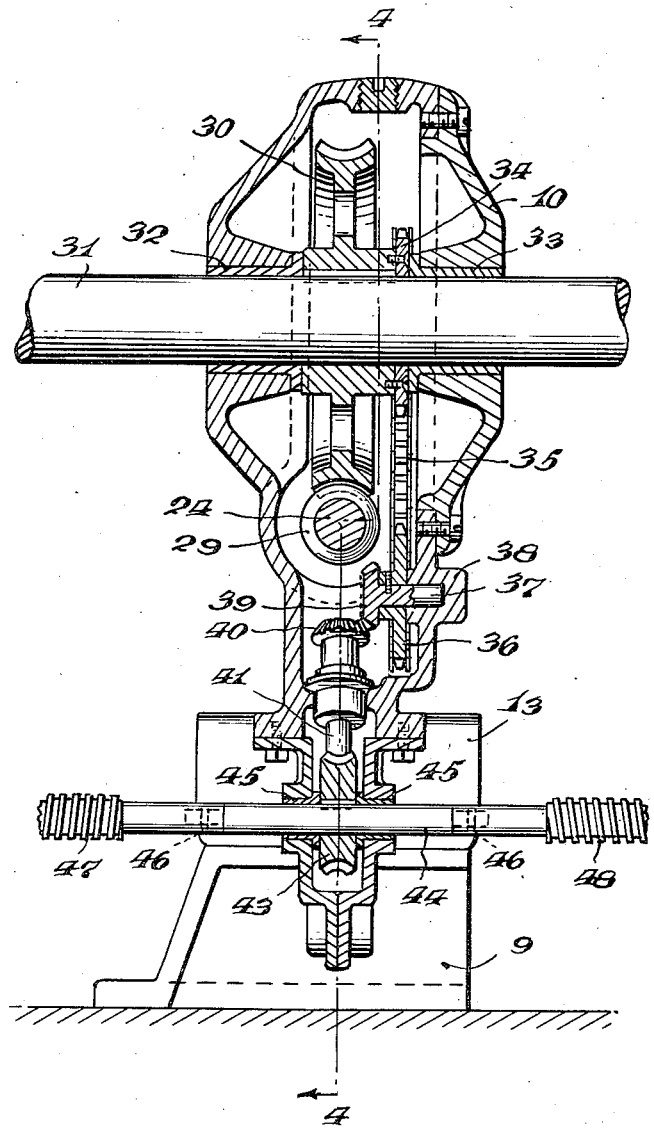

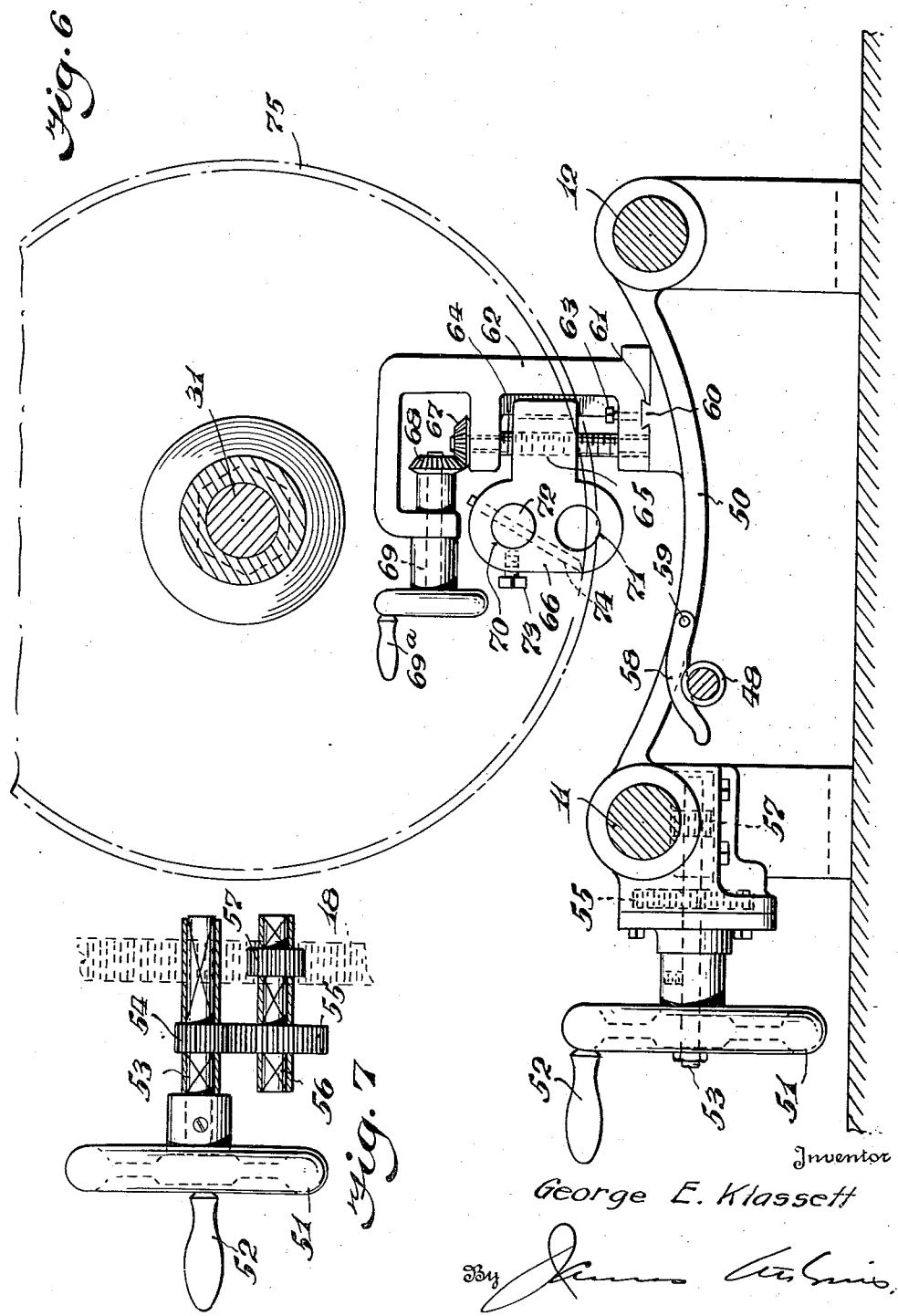

Patented Jan. 13, 1948

2,434,498

UNITED STATES PATENT OFFICE 2,434,498

BRAKE DRUM TRUEING MACHINE

George E. Klassett, Atlanta, Ga.

Application May 3, 1944, Serial No. 533,987

2 Claims. (Cl. 77—3)

This invention relates to improvements in brake drum trueing machines, and more particularly to a novel apparatus for use in trueing automobile brake drums.

One of the objects of the invention is to provide a drum trueing machine which may be used in simultaneously trueing a pair of automobile brake drums, one of which may be of the type secured to an axle.

Another object is to supply a drum trueing machine in which the cutters are suspended from their supports whereby gravity aids in maintaining the tool in contact with a drum.

With the foregoing objects outlined and with other objects in view which will appear as the description proceeds, the invention consists in the novel features hereinafter described in detail, illustrated in the accompanying drawings, and more particularly pointed out in the appended claims.

In the drawings,

Fig. 1 is a side elevation of a portion of my improved machine illustrated as operating on a plurality of drums, shown in dotted lines.

Fig. 1a is a similar view of the remaining portion of the machine.

Fig. 2 is a top plan view of the structure shown in Fig. 1, and Fig. 2a is a top plan view of the structure shown in Fig. 1a.

Fig. 3 is an end view.

Fig. 5 is a fragmentary longitudinal sectional view on the line 5—5 of Fig. 4.

Fig. 6 is a transverse vertical sectional view on the line 6—6 of Fig. 1.

Fig. 7 is a top plan view partly in horizontal section of a detail.

Figure 4:
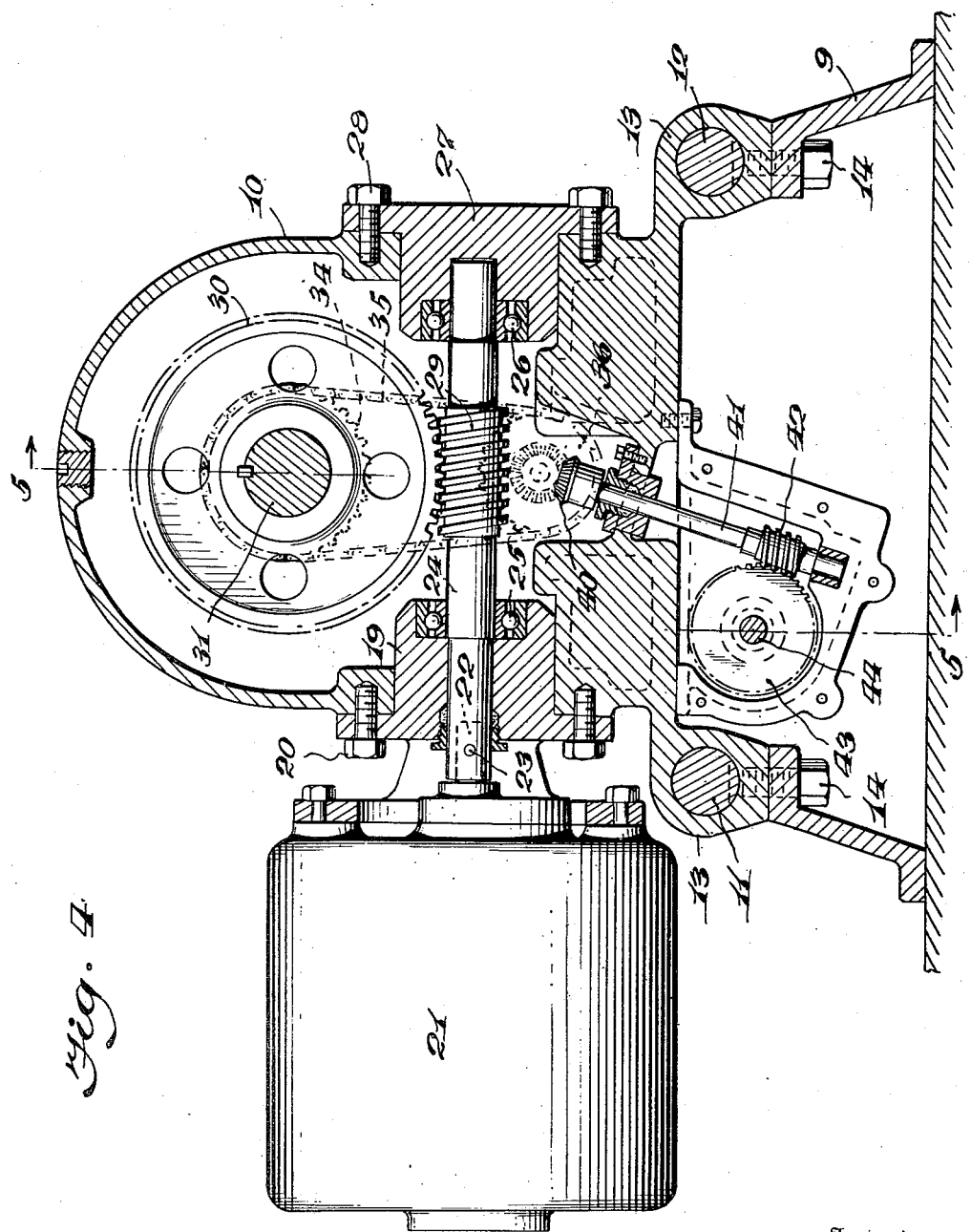
Fig. 4 is a transverse vertical sectional view taken on the line 4—4 of Fig. 5, and partly in elevation.

Referring to the drawings, 8 designates end pedestals and 9 a middle pedestal, the latter supporting a gear casing 10. A pair of horizontal rails 11 and 12 are supported by the end pedestals and extend through the base of the gear casing, as indicated at 13, and they are secured in place by screws 14, 15, and 16. The rail 11 is provided at the bottom thereof with toothed racks 17 and 18, for a purpose hereinafter described.

As best shown in Fig. 4, the gear casing is provided at one side with an adapter 19 secured in position by screws 20 and supporting an electric motor 21, the shaft 22 of which is pinned at 23 to one end of a shaft 24. The latter is journaled in an anti-friction bearing 25 in the adapter, and an anti-friction bearing 26 in a plug 27 secured to the casing by screws 28. A worm 29 arranged intermediate the ends of the shaft 24, meshes with a worm gear 30 fixed to a main shaft 31 which (Fig. 5) is journaled in bearings 32 and 33 of the casing and projects in opposite directions from the latter for the purpose of supporting and driving a plurality of brake drums, as will be hereinafter explained.

A sprocket wheel 34 is fixed to the gear 30, and drives, by means of a chain 35, another sprocket wheel 36 mounted on a stub shaft 37 journaled in a plate 38 that is preferably detachably connected to the casing. A miter gear 39, rigid with the stub shaft, drives another miter gear 40 arranged at the upper end of a shaft 41 journaled in suitable bearings in the casing and provided with a worm 42, driving a worm gear 43. The latter is fixed to a short shaft 44, parallel with the main shaft 31 and arranged below the latter.

The shaft 44 is journaled in bearings 45 (Fig. 5) and also extends through the casing, and it is pinned at 46 to oppositely extending screws 47 and 48 having oppositely pitched threads. The screw 47 is used for the movement of a cutter supporting carriage 49 toward the gear casing, and the screw 48 is used in moving the tool supporting carriage 50 toward such casing. Each of these carriages is slidably supported by the rails 11 and 12 and each carriage may also be moved along the rails under manual control by means of the type shown in Figs. 6 and 7. For example, a wheel 51 having a handle 52 is secured to a horizontally disposed shaft 53 journaled in the carriage, and a gear 54 fixed to the shaft drives a larger gear 55, rigid with a second shaft 56, also journaled in the carriage. Shaft 56 is provided with a gear 57 meshing with the rack 17, 18.

Each carriage is provided with a half nut for engagement with a screw 47, 48, and as shown in Fig. 6, for example. Each half nut may be in the form of a hand-operated lever 58 pivotally connected to the carriage, as indicated at 59. From the foregoing, it will be obvious that if the half nuts are in engagement with the screws 47, 48 and the motor is operating, the carriages will be advanced toward the gear casing. On the other hand, if the half nuts are released from the screws, either carriage may be moved along the rails 11 and 12 by actuating its handle 52.

Each carriage is preferably provided with a dove-tail key 60 arranged lengthwise of the machine, and extending into a dove-tail groove 61 of a tool supporting bracket 62. The bracket is adapted to slide along the key and to be secured in various positions of adjustment by means of a screw 63. Each bracket is provided with a rotatable screw 64 engaging internal threads 65 of a vertically adjustable tool holder 66, which may be moved up and down by the operation of a miter gear 67 on the screw which meshes with a similar gear 68 on a hand-operated shaft 69 journaled in the bracket, and provided with a handle 69a. The tool holder is preferably provided with upper and lower horizontally disposed apertures 70 and 71, either of which may receive a tool supporting spindle 72 secured in place by a screw 73. 74 designates the cutting tool carried by the spindle, and it will be noted that the tool is substantially directly beneath the axis of the shaft 31 which supports the brake drums.

As hereinbefore mentioned, an automobile brake drum 75 (Fig. 1) may be secured to one end of the shaft 31 by any suitable means, indicated generally at 76, and suitable securing means 77 may be employed to secure a second brake drum 78 to the opposite end of the shaft, the drum 78 being of the type which is fixed to the axle 79. For supporting the axle, one pedestal 8 may be provided with a split bearing 80 having a hand-operated screw 81 for use in expanding and contracting the same, the said bearing functioning as a support for one end of an auxiliary rail 82, the opposite end of which is supported by a post 83. An auxiliary carriage 84 has a clamping sleeve 85 at its lower end adapted to slide along and to be fixed to the auxiliary rail, and the carriage is provided with a split sleeve 86 that may be contracted by a hand-operated screw 87. Threaded means 88 within the sleeve, and actuated by a handle 89, is used for the horizontal adjustment of a conical abutment 90 designed to impinge against one end of the axle 79 for use in rotatably supporting the latter.

*Operation*

The machine can be employed in trueing either a single drum or two drums simultaneously, and as a description of the operation for two drums will suffice in treating a single drum, the two drum operation will now be described. While the carriages 49 and 50 are retracted, the operator attaches two drums 75 and 78 to the opposite ends of the main shaft 31 by means of the devices 76 and 77, and the conical abutment 90. By operating the handle 52, while the half nuts 58 are out of engagement with the screws 47 and 48, he can cause the gears 57 to travel along the racks 17 and 18 so as to bring the tools 74 into proper relation with the drums. When this is accomplished, the handles 69a can be used to bring the tools 74 into engagement with the inner peripheries of the drums. Then the motor may be started by using a control switch 91. As the motor shaft turns, it will cause the main shaft 31 and the screw shaft 44 to revolve, and if the half nuts 58 are at this time in engagement with the screws 47, 48, it will be understood the carriages will be moved toward one another while the tools 74 act on the revolving brake drums. When the drums are trued, the motor may be stopped and the half nuts disengaged from the screws, and the carriages may be returned to retracted position by the operation of the handles 52, so that the drums may be removed.

With a structure of the character described, it will be understood that drums at the opposite ends of the main shaft will tend to counter-balance one another, and the work of the screws 47 and 48 will be rendered easier because each is motivating substantially the same load.

While I have disclosed what I now consider to be a preferred embodiment of the invention in such manner that the same may be readily understood by anyone skilled in the art, I am aware that changes may be made in the details disclosed without departing from the spirit of the inveniton, as expressed in the claims.

What I claim and desire to secure by Letters Patent is:

1. A brake drum trueing machine comprising a substantially horizontally disposed rotatable shaft, means for supporting and rotating it, means for detachably securing a brake drum and axle to said shaft, means for rotatably supporting said axle, a tool for operating on the drum as it is revolved by the shaft, and means for automatically moving the tool parallel to the axis of the shaft while it is operating on the drum.

2. A brake drum trueing machine according to claim 1, wherein said means for rotatably supporting the axle comprises a rail, a carriage adjustably supported by the rail, and a conical abutment adjustably supported by the carriage for engaging the end of the axle.

GEORGE E. KLASSETT.

REFERENCES CITED

The following references are of record in the file of this patent:

UNITED STATES PATENTS

| Number | Name | Date |
| --- | --- | --- |
| 1,947,234 | Sundstrand | Feb. 12, 1934 |
| 1,925,177 | Delf | Sept. 5, 1933 |
| 594,380 | Cartwright | Nov. 30, 1897 |
| 913,312 | Sellew | Feb. 23, 1909 |
| 353,429 | Reynolds | Nov. 30, 1886 |

FOREIGN PATENTS

| Number | Country | Date |
| --- | --- | --- |
| 22,205 | Great Britain | Oct. 15, 1903 |
| 6,352 | Great Britain | June 28, 1906 |